United States Patent [19]

Worden et al.

[11] 4,443,511

[45] Apr. 17, 1984

[54] ELASTOMERIC WATERPROOF LAMINATE

[75] Inventors: Dexter Worden; Frederic T. Wilson, both of Newark, Del.; Linda J. Grubb, Elkton, Md.

[73] Assignee: W. L. Gore & Associates, Inc., Newark, Del.

[21] Appl. No.: 443,137

[22] Filed: Nov. 19, 1982

[51] Int. Cl.$^3$ .............................................. B32B 7/14
[52] U.S. Cl. ...................................... 428/198; 264/127; 264/288.8; 264/290.2; 264/DIG. 47; 428/196; 428/197; 428/246; 428/252; 428/253; 428/284; 428/422; 428/423.1; 428/910
[58] Field of Search ............ 428/252, 421, 422, 423.1, 428/253, 246, 284, 910, 198, 196, 197; 264/127, 264/288.8, 289.3, 289.6, 290.2, DIG. 47, DIG. 70

[56] References Cited

U.S. PATENT DOCUMENTS 3,953,566 4/1976 Gore .................................... 264/127
4,194,041 3/1980 Gore et al. ........................... 428/422
4,277,429 7/1981 Okita ................................. 264/288.8

Primary Examiner—James J. Bell
Attorney, Agent, or Firm—Delcina Esser

[57] ABSTRACT

This invention provides a waterproof and breathable elastomeric polytetrafluoroethylene layered article for use in, for example, material for protective articles. The waterproof and breathable polytetrafluoroethylene layered article can for example, exhibit elastomeric properties of stretch to break of 275% in the machine direction, and 145% in the transverse direction and a total stretch recovery of at least 39% after being stretched to 75% extension for 100 cycles. This invention further provides a waterproof and breathable elastomeric polytetrafluoroethylene layered article bonded to a stretch fabric. The waterproof and breathable elastomeric polytetrafluoroethylene layered article bonded to a stretch fabric is thus durable and possesses a moisture vapor transmission rate exceeding 1000 gms/m$^2$ day, and preferably above about 2000 gms/m$^2$ day.

18 Claims, 6 Drawing Figures

ELASTOMERIC WATERPROOF LAMINATE

BACKGROUND OF THE INVENTION

Materials used for protective articles for wear in rain, snow or other wet conditions should keep the wearer dry by preventing the leakage of water into the article and by allowing perspiration to evaporate from the wearer to the outside of the article.

Fabrics treated with silicones, fluorocarbons, and other water repellents usually allow evaporation of perspiration but are only marginally waterproof; they allow water to leak through them under very low pressures, and usually leak spontaneously when rubbed or mechanically flexed.

A recent invention (U.S. Pat. No. 4,194,041) has provided a waterproof and breathable polytetrafluoroethylene (PTFE) laminate that possesses a high moisture vapor transmission rate even under adverse climatic conditions. Such laminates and modified forms thereof are commercially available from W. L. Gore & Associates, Inc. The waterproof and breathable laminate of U.S. Pat. No. 4,194,041 consists of a flexible first layer of a microporous hydrophobic material having a moisture vapor transmission rate exceeding 1000 gms/m$^2$ day, an advancing water contact angle exceeding 90 degrees and a second layer of continuous hydrophilic elastomeric material attached to the inner face of the first layer whereby the second layer has a moisture vapor transmission rate exceeding 1000 gms/m$^2$ day and does not permit the detectable passage of liquid water therethrough at hydrostatic pressures of about 24 cm water head and about 172 KN/m$^2$ for 30 seconds.

The porous membrane of expanded polytetrafluoroethylene (PTFE) used in the above laminate can be provided by following the techniques of U.S. Pat. No. 3,953,566. Such membranes and modified forms thereof are commercially available under the registered trademark GORE-TEX®, sold by W. L. Gore & Associates, Inc. These expanded, porous PTFE membranes satisfy the requirements of being waterproof while also being permeable to the flow of water vapor. The expanded porous PTFE membranes are inherently hydrophobic and contain very small pores that resist the entry of liquid water even at substantial pressures or when rubbed or flexed, but readily allow the flow of gases including water vapor. Unlike wicking materials breathability is achieved by evaporation of liquid water inside the garment or on the inner surface of the membrane followed by gaseous flow or diffusion of water vapor through the membrane to the outside.

In addition to the waterproofness and breathability of protective articles, it is desirable for such articles to have the distinguishing characteristic of stretch. Stretch offers to the consumer many advantages such as comfort, fit, reduced pucker, improved wrinkle resistance, the need for fewer sizes, alterations and greater design flexibility. In its broad concept, "stretch" might be defined as the comfort factor in textile products. In specific textile applications, the technology of stretch relates to fibers, yarns and fabrics; and the extent of its presence in textile products is a matter of its functional advantage for a particular end use.

According to the *Encyclopedia of Textiles*, third edition, pages 310 to 315, there are two categories of stretch fabrics based on the degree of stretchability. They are: (1) Power or Action Stretch and (2) Comfort Stretch.

"Power Stretch, or Action Stretch, as the names imply, provides a fabric with a high degree of extensibility and quick recovery. The stretch factor generally ranges from at least 30 to 50 percent or more with no more than 5 to 6 percent loss in recovery. Such stretch fabrics are best adapted to skiwear, foundation garments, swimwear, athletic clothing and professional types of active sportwear. Comfort Stretch applies to fabrics with less than a 30 precent stretch factor and no more than 2 to 5 percent loss in recovery. Such fabrics are used in clothing for everyday wear which need only a moderate degree of elasticity."

In the clothing field, increasing use is being made of garments made of stretch fabrics where flexibility of movement is essential; for example, athletic garments, running suits, exercise suits, skiwear, etc. These garments are usually worn where waterproofness and breathability of the garment is desired also.

FIG. 1 shows the percentage of back flex (a), knee flex (b), seat flex(c), and elbow flex (d). The percentage of flex in these areas indicates the minimum degree of stretchability in a fabric needed to maintain comfort to the wearer.

By the addition of strips, inserts or gussets of stretchable material into a nonstretchable waterproof breathable garment, partial stretch and flexibility is imparted to the garment. In addition, it is desirable to use stretch fabrics for the collars, cuffs and waistbands of stretch garments and other garments, as well. However, waterproofness and breathability of these strips, inserts, or gussets is desired also in order to make the garments totally waterproof and breathable while introducing partial stretch and flexibility to the garments.

BRIEF DESCRIPTION OF THE INVENTION

The invention provides a stretchable waterproof and breathable elastomeric layered article and a method for making such an article. The stretchable waterproof and breathable layered article is formed by mechanically stretching a laminar composite article comprising:

(a) a first layer of hydrophobic material having a moisture vapor transmission rate exceeding 1000 gms/m$^2$ day and an advancing water contact angle exceeding 90 degrees; and (b) an elastomeric hydrophilic layer having a major portion of one surface in interlocking relationship with the inner face of said first layer, said hydrophilic layer having a moisture vapor transmission rate exceeding 1000 gms/m$^2$ day, the stretching step extending the first layer in one direction at least 5% beyond its yield point.

The composite article is preferably stretched in the machine direction and/or the transverse direction. Such stretching will alter the elastic properties of the composite article. By controlling the stretching in the machine direction and/or in the transverse direction, the elastic properties of the composite articles can be adjusted to accommodate the needs of different end uses.

This invention also provides a waterproof and breathable elastomeric porous PTFE layered article bonded to a stretch fabric.

The novel stretch characteristics of the layered article of the present invention provide the advantages of stretch fabrics such as, greater comfort, better fit, more shape retention, improved wrinkle resistance, fewer sizes and alterations, and more design flexibility; in addition to being waterproof and breathable.

DETAILED DESCRIPTION OF THE INVENTION

Figure 1:
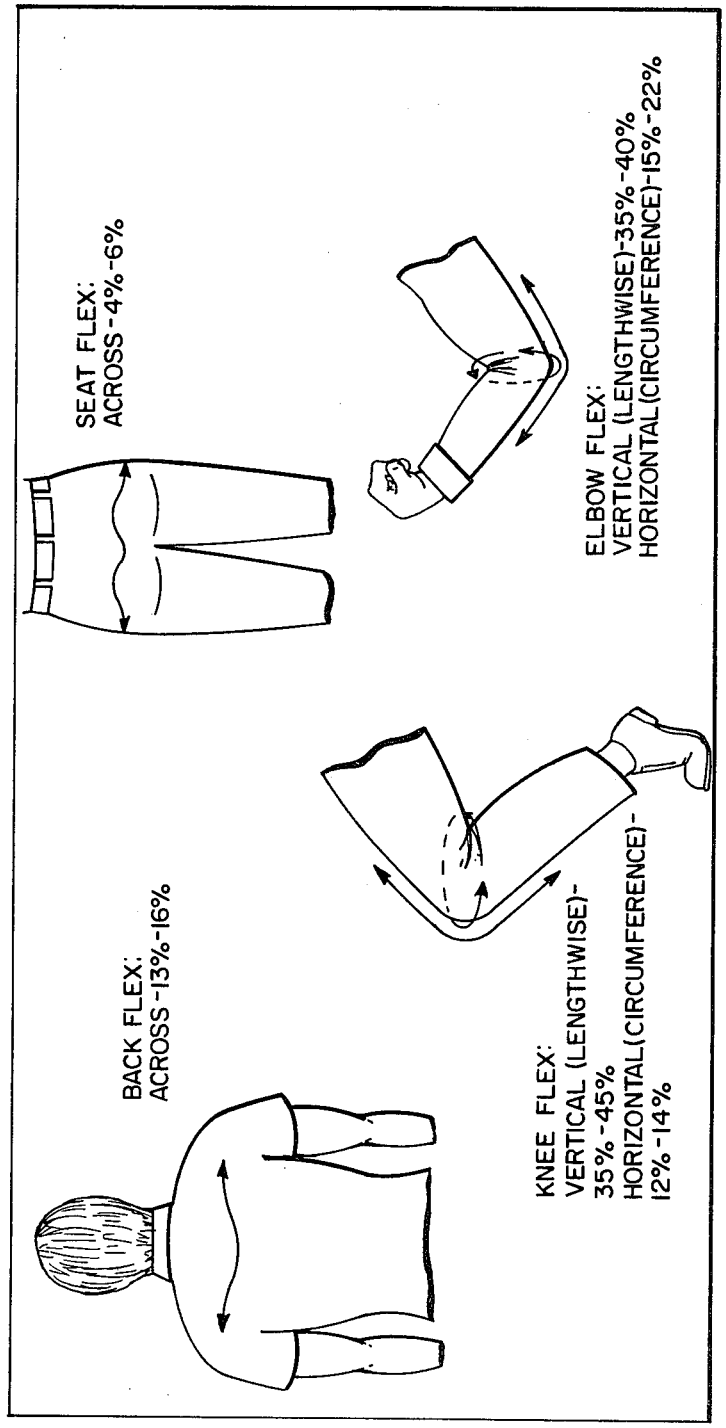

The present invention is based on the discovery that when a breathable polytetrafluoroethylene (PTFE) layered article is mechanically stretched at least about 5% beyond its yield point unexpected stretch and recovery properties are developed. An elastic material is formed having an elastic recovery average of for example, at least 39% for 100 cycles. In addition, it has been discovered, that with the mechanical stretching of the PTFE layered article, the continuous integrity of the elastomeric hydrophilic layer is not interrupted and the continuity of the hydrophobic layer is maintained, thereby retaining the properties of breathability, waterproofness, and introducing the property of stretchability.

The hydrophobic layer of the PTFE layered article is stretchable having an elongation in the machine direction of up to about 425% and an elongation in the transverse direction of up to about 405%. The hydrophilic layer of the PTFE layered article is stretchable having an elongation in the machine direction and elongation in the transverse direction of up to about 154%. After the hydrophobic layer is laminated to the hydrophilic layer, the hydrophilic layer imparts elasticity of recovery to the stretchable hydrophobic layer. The hydrophobic/hydrophilic layered article possesses qualities unforseen in the hydrophobic and hydrophilic layers alone (see table 1).

flowing the hydrophilic elastomeric material into the layer of hydrophobic material and then solidifying the hydrophilic material. For example, flowable hydrophilic monomer or prepolymer can be deposited on the hydrophobic membrane, pressed into the porous structure of the membrane, and subsequently polymerized or cured to interlock the layers.

The hydrophilic layer can be formed from such materials disclosed in U.S. Pat. No. 4,194,041, the disclosure of which is incorporated herein by reference, and from hydrophilic elastomers including but not limited to elastomers made from poly(esters), poly(amides), cellulose derivatives, poly(acrylic acid) and its homologs, natural or synthetic rubber with hydrophilic impurities, copolyoxamides, polyureas, polyelectrolytes, poly(phosphates), poly(vinylamine), poly(vinylalcohol), poly(ether) and copolymers thereof, poly(thioether), polythioether-polyether, copoly(epichlorohydrinether), poly(sulphosphates), copolyester-ether and derivatives or mixtures thereof. The physical properties of the layered article with respect to moisture vapor transmission and resistance to transmission of liquid water closely resemble the physical properties of the expanded miroporous polytetrafluoroethylene alone. The layered article is mechanically stretched beyond the yield point of the expanded microporous polytetrafluoroethylene at least 5%, and released thus forming a waterproof, breathable elastomeric expanded microporous polytetrafluoroethylene layered article (see table 1).

TABLE 1

STRETCH TO BREAK

| weight/area | GORE-TEX ® Membrane .019 (g/in$^2$) | | | HYDROPHILIC/HYDROPHOBIC Layered Article .018 (g/in$^2$) | | | GORE-TEX ® Membrane .007 (g/in$^2$) | | |
| --- | --- | --- | --- | --- | --- | --- | --- | --- | --- |
| 5" × 5" SAMPLE DIRECTION | FORCE POUNDS | ELONG IN INCHES | % OF ELONG TO BREAK | FORCE POUNDS | ELONG IN INCHES | % OF ELONG TO BREAK | FORCE POUNDS | ELONG IN INCHES | % OF ELONG TO BREAK |
| MACHINE DIRECTION | 1.07 | 18.1 | 452% | .83 | 11.0 | 275% | .90 | 9.2 | 230% |
| TRANSVERSE DIRECTION | .90 | 16.2 | 405% | 1.50 | 5.8 | 145% | 1.55 | 3.0 | 75% |

| | weight/area | HYDROPHILIC/HYDROPHOBIC Layered Article .013 (g/in$^2$) | | | *HYDROPHILIC LAYER Thickness = .0067" | | |
| --- | --- | --- | --- | --- | --- | --- | --- |
| | 5" × 5" SAMPLE DIRECTION | FORCE POUNDS | ELONG IN INCHES | % OF ELONG TO BREAK | FORCE POUNDS | ELONG IN INCHES | % OF ELONG TO BREAK |
| | MACHINE DIRECTION | 1.22 | 8.2 | 205% | 2.48 | 3.08 | 154% |
| | TRANSVERSE Direction | 1.45 | 4.5 | 113% | 2.48 | 3.08 | 154% |

Figure 2A:
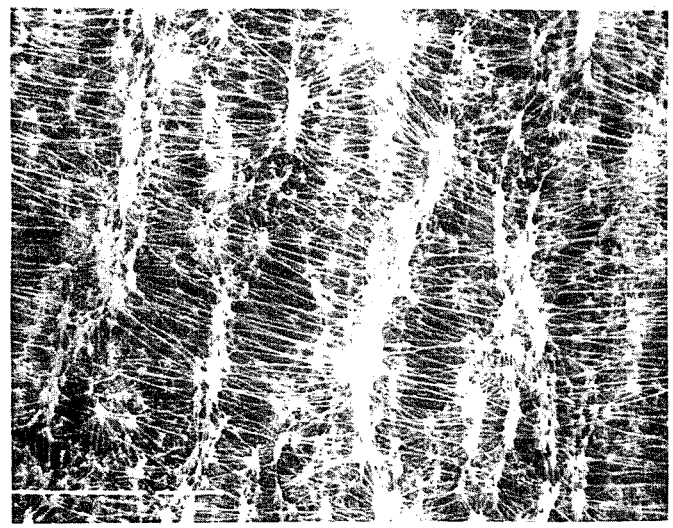

Full Scale Load 5 (pounds)
Chart Speed 20 inches/minute
½ (inch) Sample Width
20 (inches/min.) Crosshead Speed
4 (inches) Gap
*Full Scale Load 10 (pounds)
Chart Speed 20 inches/minute
½ (inch) Sample Width
20 (inches/min.) Crosshead Speed
2 (inches) Gap
85% recovery for 106 cycles The waterproof and breathable porous polytetrafluoroethylene layered article comprises a first layer of a hydrophobic material such as expanded continuous microporous polytetrafluoroethylene in laminar contact with a second layer of hydrophilic elastomeric material such as a polyether-polyurethane wherein a major portion of both layers are in a continuous interlocking relationship with each other. A continuous interlocking relationship, which is preferred, can be attained by In FIG. 2(a) the Scanning Electron Micrograph of a GORE-TEX ® Membrane layer of the layered article is shown under 2000× in an unstretched relaxed state.

Figure 2B:
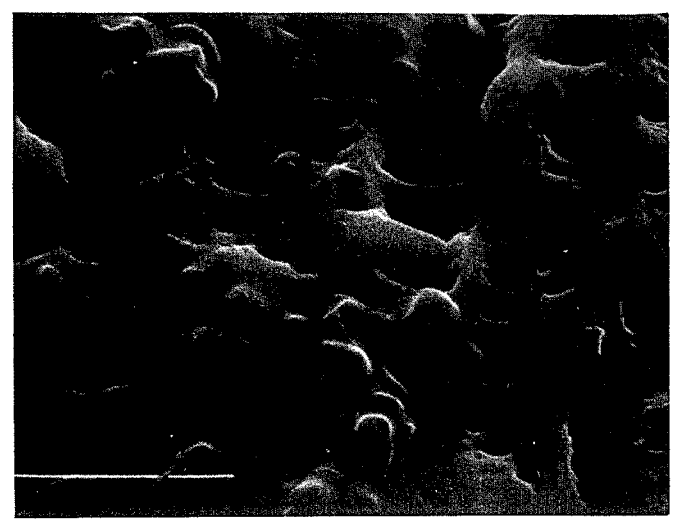

In FIG. 2(b) the Scanning Electron Micrograph of a hydrophilic layer of the layered article is shown under 2000× in an instretched relaxed state.

Figure 3A:
Figure 3B:
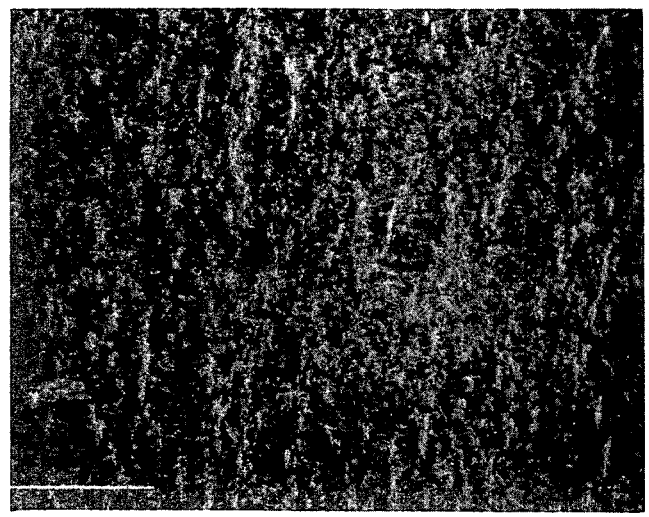
Figure 3C:
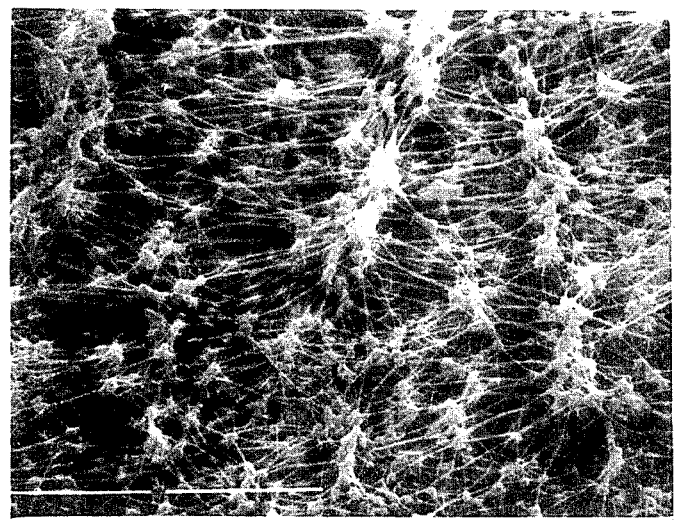

In FIG. 3 the Scanning Electron Micrograph of a GORE-TEX ® Membrane surface of the layered article is shown under 30× (a), 700× (b) and 5000× (c) in an unstretched relaxed state.

Figure 4A:
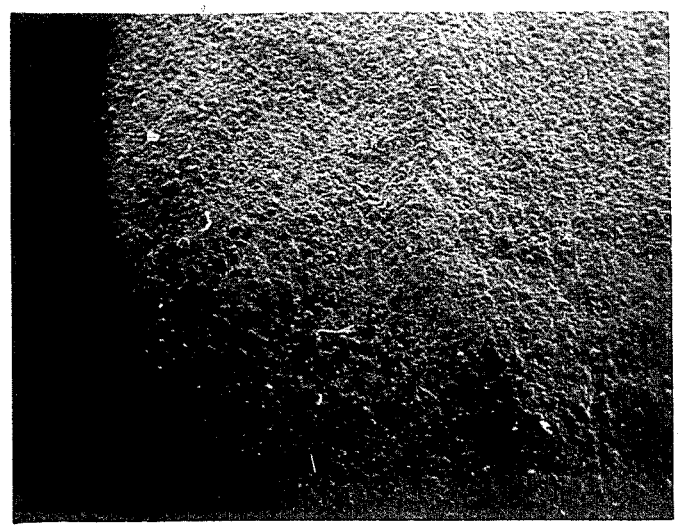
Figure 4B:
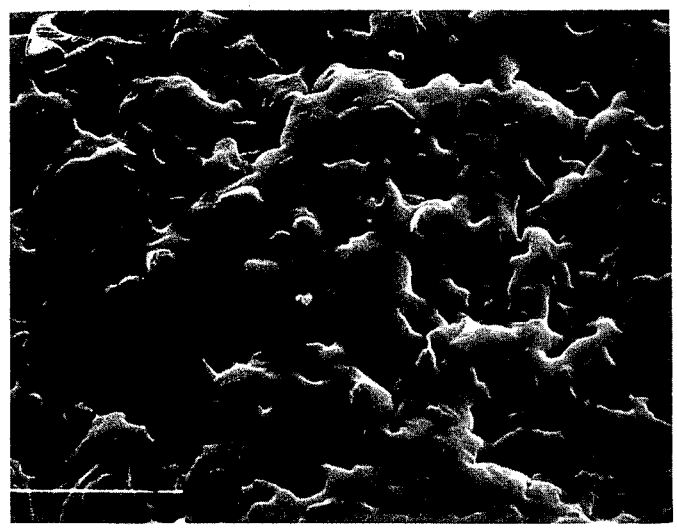
Figure 4C:
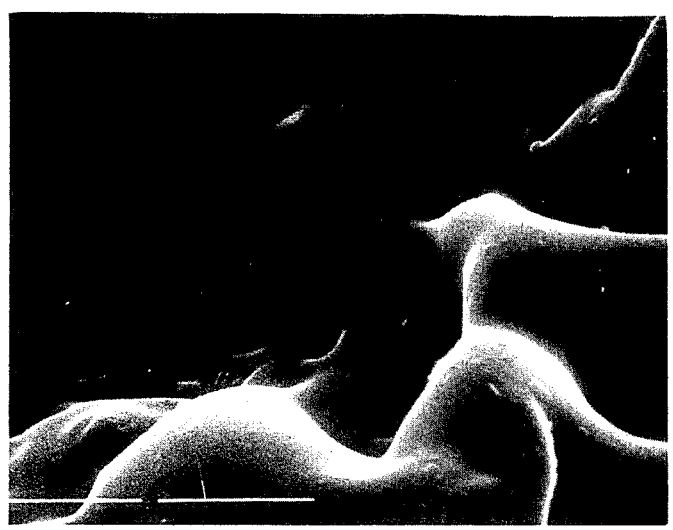

In FIG. 4 the Scanning Electron Micrograph of a hydrophilic layer of the layered article is shown under 30× (a), 700× (b) and 5000× (c) in an unstretched relaxed state.

Figure 5A:
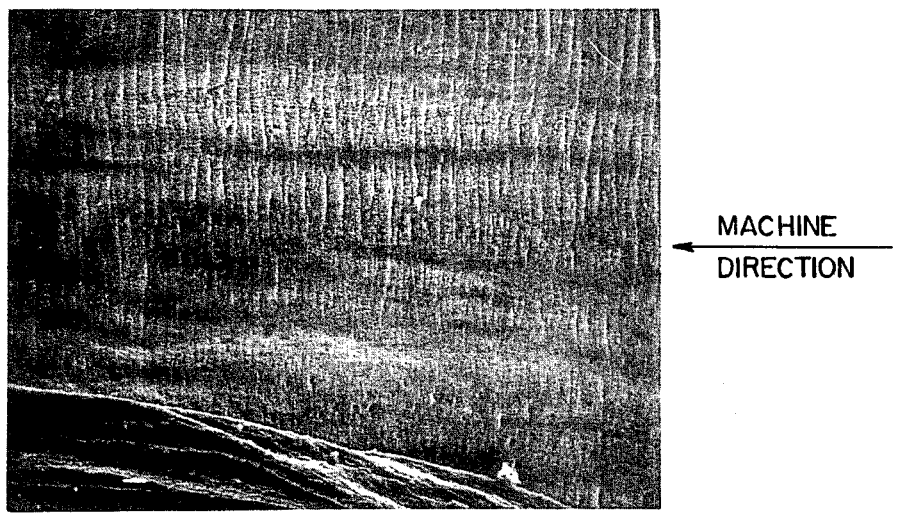
Figure 5B:
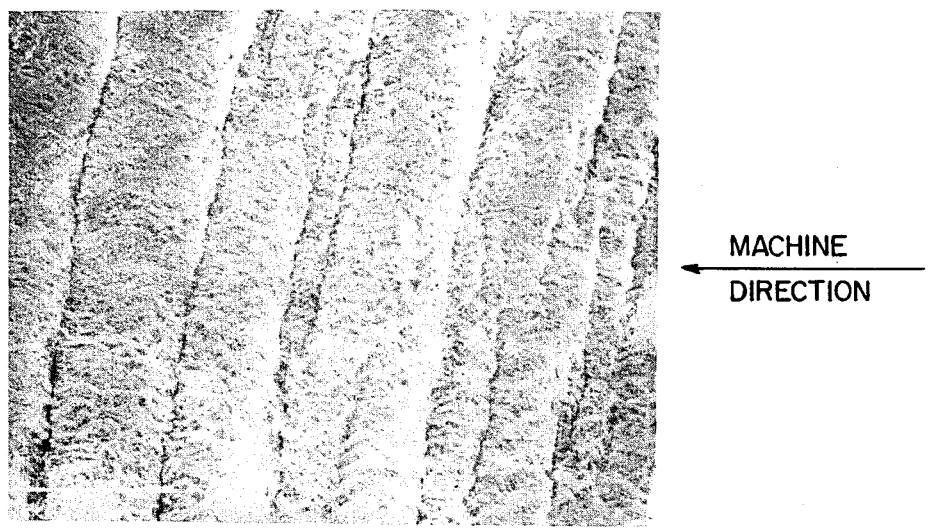
Figure 5C:
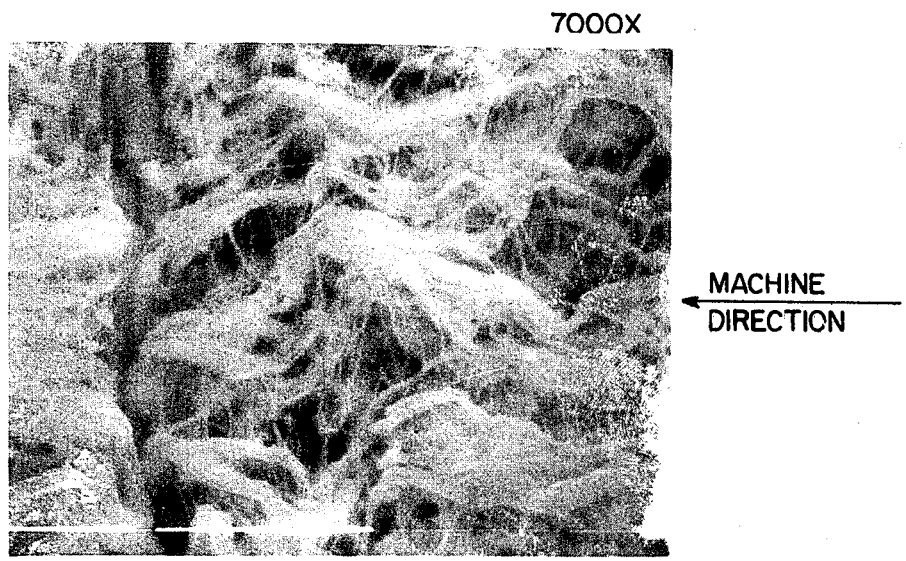

In FIG. 5 the Scanning Electron Micrograph of the GORE-TEX ® Membrane surface of the layered article after stretching to break in the machine direction shows striations perpendicular to the machine direction in both the 30× (a) and 700× (b). The 7000× (c) shows altered orientation in both the machine and transverse directions.

Figure 6A:
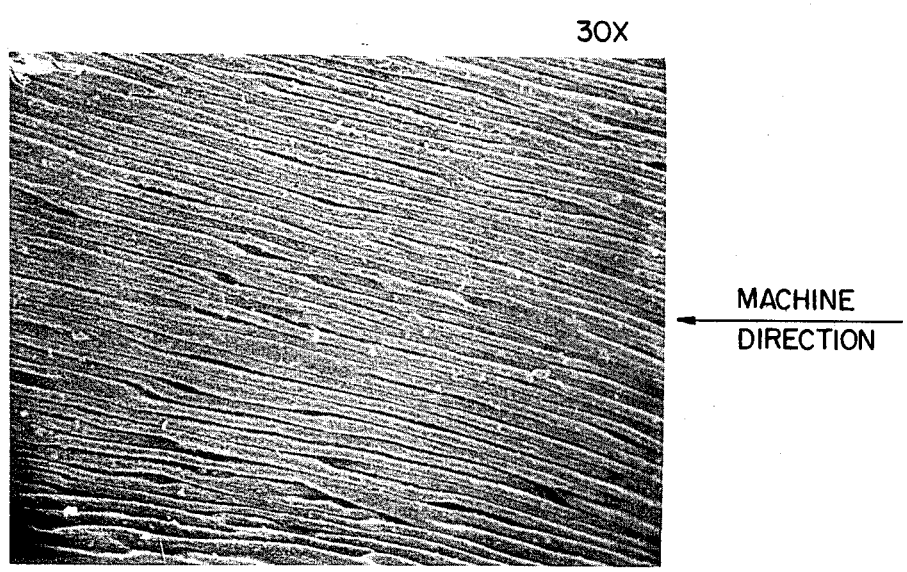
Figure 6B:
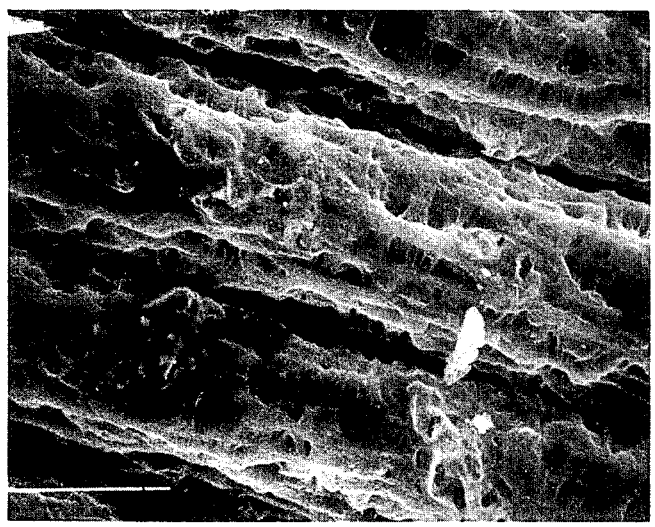
Figure 6C:
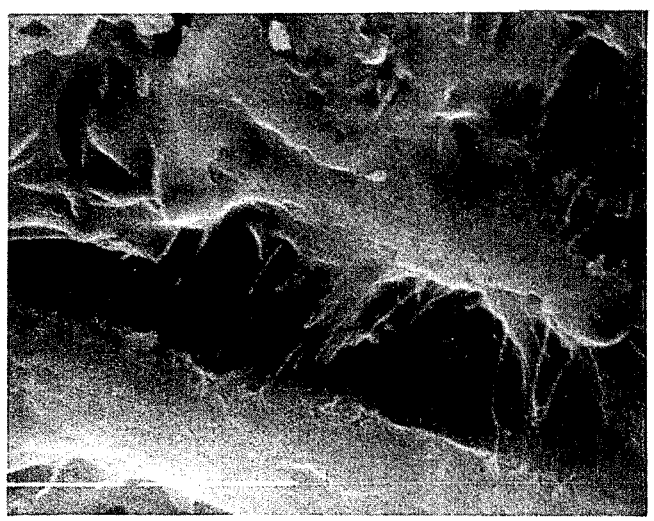

In FIG. 6 the Scanning Electron Micrograph of the hydrophilic layer surface of the layered article after stretching to break in the machine direction show striations in the machine direction which are visible in the 30× (a) and 700× (b). One striation is visible in the 5000× (c) in the machine direction which illustrates the total continuity of the hydrophilic surface.

There were no breaks in the continuity of either the hydrophobic or hydrophilic surface under magnifications of from 30× to 7000×.

The following examples are illustrative of this invention and are not intended to be limiting.

EXAMPLE 1

A 14" long by 12" wide sample of GORE-TEX ® Membrane/polyether-polyurethane layered article was tested as follows:

A 9" long by 10" wide area was marked by crosshatches at 1" intervals. The piece was folded into a strip 1"–1¼" wide by 14" long and pulled, in machine direction on the Instron test machine.

Gauge length=9"
Crosshead and chart speed=50"/minute=556%/minute

At 18" extension the crosshead was stopped. The sample had necked to ⅜"–½" wide. The crosshead was returned at 50"/minute. At approximately 6.5" extension on the return trip the force (in tension) dropped to zero.

The surface of the polyether-polyurethane layer was sprayed with isopropanol to show up any pinholes which were created during testing. No pinholes were noted indicating that despite the 200% extension undergone in testing, the polyether-polyurethane layer was still intact and the continuity of the hydrophilic layer had not been altered. The GORE-TEX ® Membrane/polyether-polyurethane layered article had an immediate stretch recovery of 64%.

EXAMPLE 2

Samples of the hydrophobic/hydrophilic layered article were tested further by strain cycling the 100 cycles at 75% extension. They exhibited an elastic recovery average of 51.5%.

EXAMPLE 3

Samples of hydrophobic/hydrophilic layered article were stretched to break in the machine and transverse directions.

| MACHINE DIRECTION ($L_1$) | TRANSVERSE DIRECTION ($T_1$) |
|---|---|
| % elong to break | % elong to break |
| 215% | 55% |

The samples of $L_1$ after stretching to break were further tested continuously as follows:
10 cycles to 10% elongation showed over 95% recovery,
10 cycles to 20% elongation showed 80%–85% recovery,
10 cycles to 30% elongation showed 80%–85% recovery,
10 cycles to 50% elongation showed 80%–85% recovery,
11 cycles to 100% elongation showed 80% recovery,
10 cycles to 150% elongation showed about 75% recovery, 11 cycles to 200% elongation showed about 75% recovery.

The samples of $T_1$ after stretching to break were further tested continuously as follows:
10 cycles to 10% elongation showed over 95% recovery,
10 cycles to 20% elongation showed 75% recovery,
10 cycles to 30% elongation showed about 75% recovery,
10 cycles to 50% elongation showed about 75% recovery.

EXAMPLE 4

A stretch fabric was made consisting of the following four layers:

First, a layer of material sold under the trade designation Lycra, by E. I. du Pont de Nemours & Company, Inc., was affixed to a layered material as described in Example 1 by gravure printing a dot pattern of adhesive onto the elastomeric layer of the layered material and pressing the Lycra to it through a nip roll and then over a heated roll. The resulting laminate was then mechanically stretched first in the transverse direction and secondly in the machine direction thereby providing a stretchable, waterproof, breathable, elastomeric layered article. This resulted in a well bonded laminate.

The elastomeric laminate of this invention exhibited waterproofness and breathability properties. The elastomeric PTFE laminate measured by the Suter Test for waterproofness had the following properties:

25 cm water pressure—no leak after 20 minutes, and the Mullins Burst Test (Federal Standard 191, Method 5512): 25 psig water pressure—no leak after 20 seconds.

In addition to the above tests for waterproofness, the fabric, which was bonded to the hydrophilic layer of the layered article, was smeared with a cotton swab of isopropyl alcohol. Isopropyl alcohol is used to indicate the integrity of the continuity of the hydrophilic layer. No penetration of isopropyl alcohol was observed through to the hydrophobic layer. Visual observation of the hydrophobic layer indicated no wetting of the hydrophobic layer, consequently, the isopropyl alcohol did not penetrate through the hydrophilic layer to the hydrophobic layer.

We claim:

1. A process for forming a stretchable composite article having at least two layers comprising the steps of:

(i) mechanically stretching the composite to impart stretch and recovery properties thereto, said layers comprising:
  (a) a first layer of hydrophobic material having a moisture vapor transmission rate exceeding 1000 gma/m² day and an advancing water contact angle exceeding 90 degrees; and
  (b) an elastomeric hydrophilic layer having a major portion of one surface in interlocking relationship with the inner face of said first layer, said hydrophilic layer having moisture vapor transmission rate exceeding 1000 gms/m² day, the stretching step extending the first layer in one direction at least 5% beyond its yield point; and
(ii) relaxing the stretched composite.

2. A stretchable composite article formed by the process of claim 1.

3. The stretchable composite article formed by the process of claim 1, in which the article is stretched mechanically in the machine direction.

4. The stretchable composite article formed by the process of claim 1, in which the article is stretched mechanically in the machine direction and in a transverse direction.

5. The stretchable composite article formed by the process of claim 1, in which the article is stretched mechanically in the machine direction and in a transverse direction.

6. A stretchable composite article formed by the process of claim 1, in which the hydrophobic layer comprises a microporour sheet of expanded polytetrafluoroethylene.

7. A stretchable composite article formed by the process of claim 1, in which the hydrophilic layer comprises a polyether-polyurethane.

8. A process for forming a stretchable composite fabric having distinct layers comprising:
(i) mechanically stretching the composite fabric to impart stretch and recovery thereto, said distinct layers comprising: in laminar combination
  (a) a textile outer layer,
  (b) an elastomeric hydrophilic inner layer, said hydrophilic layer having one surface in contact with said textile outer layer and having a moisture vapor transmission rate exceeding 1000 gms/m² day and having stretch and recovery properties,
  (c) a continuous hydrophobic layer having a moisture vapor transmission rate exceeding 1000 gms/m² day and an advancing water contact angle exceeding 90 degrees, a major portion of said hydrophilic layer in interlocking relationship with said hydrophobic layer, said stretching step extending the hydrophobic layer in one direction at least 5% beyond its yield point, and
(ii) relaxing the stretched composite fabric.

9. A stretchable composite fabric formed by the process of claim 8.

10. The stretchable composite fabric formed by the process of claim 8, in which the composite fabric is stretched mechanically, to impart stretch and recovery thereto, in the machine direction.

11. The stretchable composite fabric formed by the process of claim 8, in which the composite fabric is stretched mechanically, to impart stretch and recovery thereto, in the transverse direction.

12. The stretchable composite fabric formed by the process of claim 8, in which the composite fabric is stretched mechanically, to impart stretch and recovery thereto, in the machine direction and in the transverse direction.

13. The stretchable composite fabric formed by the process of claim 8, in which the hydrophobic layer is a microporous sheet of expanded polytetrafluoroethylene.

14. The stretchable composite fabric formed by the process of claim 8, in which the hydrophilic layer is bonded to the outer layer by an open pattern of adhesive dots.

15. The stretchable composite fabric formed by the process of claim 8, in which the textile outer layer is woven material.

16. The stretchable composite fabric formed by the process of claim 8, in which the textile outer layer is a non-woven material.

17. The stretchable composite fabric formed by the process of claim 8, in which the textile outer layer is a textile material having stretch and recovery properties.

18. The stretchable composite fabric formed by the process of claim 8, in which the textile outer layer does not inherently possess stretch and recovery properties, but exhibits stretched and recovery when bonded to said elastomeric hydrophilic layer.

* * * * *